United States Patent [19]

Iwata

[11] Patent Number: 4,732,041

[45] Date of Patent: Mar. 22, 1988

[54] AUTOMOBILE THEFT SENSOR

[75] Inventor: Keisuke Iwata, Tokyo, Japan

[73] Assignee: Kabushiki Kaisha Iwata Electric, Tokyo, Japan

[21] Appl. No.: 1,348

[22] Filed: Jan. 8, 1987

[30] Foreign Application Priority Data

Nov. 21, 1986 [JP] Japan .............................. 61-179398[U]

[51] Int. Cl.⁴ ...................... B60R 25/00; G01H 11/08
[52] U.S. Cl. ........................................... 73/654; 340/65
[58] Field of Search ...................... 73/517 R, 652, 654, 73/651, DIG. 1; 340/65, 566, 683; 307/117, 121, 10 AT; 310/329

[56] References Cited

U.S. PATENT DOCUMENTS

| 2,524,579 | 10/1950 | Taylor | 340/683 |
| 4,368,525 | 1/1983 | Obata et al. | 367/165 |
| 4,584,569 | 4/1986 | Lopez et al. | 340/566 |

Primary Examiner—Stewart J. Levy
Assistant Examiner—Robert P. Bell
Attorney, Agent, or Firm—Murray Schaffer

[57] ABSTRACT

A sensor of the theft and the like of an automobile wherein a thin plate is fixed at one end to a base, an elastic string is stretched between the other end of the thin plate and a supporting plate provided from the above mentioned base, a weight is provided in the middle of the string and a sheet-shaped buffer material, conductive thin plate and piezoelectric element are successively pasted to the above mentioned thin plate.

2 Claims, 3 Drawing Figures

AUTOMOBILE THEFT SENSOR

FIELD OF THE INVENTION

This invention relates to a sensor of the theft and the like of an automatic fitted in such proper space within the engine compartment chassis, passenger compartment, center pillar or trunk of an automobile to generate a signal in response to a shock or vibration caused when the automobile tire is removed, the window glass is broken or the key is inserted into the key hole of the door or trunk and to thereby prevent the theft or the like of the automobile as combined with any alarm and the like.

BACKGROUND OF THE INVENTION

There are already suggested such sensors of the theft and the like of an automobile as a high frequency vibration sensor wherein, in order to avoid a mis-operation caused by a foreign acoustic noise or the like, a resonance system having a resonance frequency above 2 KHz is formed to take out as a sensing signal the vibration of the car body near that resonance frequency and a low frequency vibration sensor wherein a resonance system having a resonance frequency below several 10 Hz is formed to take out as a sensing signal the vibration of the car body near that resonance frequency.

However, there has been a defect that the high frequency vibration above 2 KHz will attenuate so much in case it is transmitted through the car body that the place of fitting the above mentioned high frequency vibration sensor is limited. On the other hand, under the influence of the buffer springs and elastic rubber bodies used in the car body, the low frequency vibration below several 10 Hz will attenuate comparatively so little as to well propagate to the corners of the car body and therefore the place of fitting the above mentioned low frequency vibration sensor need not be selected.

Therefore, the above mentioned low frequency vibration sensor has been mostly used as a sensor of the theft and the like of an automobile.

However, in the already provided low frequency vibration sensor, the resonance system is formed, for example, of only a thin plate fixed at one end, therefore the resonance sharpness is so large that, in case the specific conditions are not met at the time of a theft or, for example, the kind of the automobile and the loaded weight are different, the theft and the like of the automobile will not be likely to be positively sensed.

Therefore, there has come to be provided a sensor wherein a resonance system having a resonance frequency above several 10 Hz is formed, a low pass filter of a cut-off frequency of several 10 Hz is provided and a feeble signal below several 10 Hz in the attenuating range of the above mentioed resonance system deviated from the above mentioned resonance frequency is amplified by an amplifier to be a sensing signal.

However, according to this sensor, there have been defects that, though all the vibrations of the car body below the frequency of several 10 Hz can be detected, the amplitude of the above mentioned amplifier will be practically required to be above 100 dB, the influence of the noise and the like generated from the amplifier and current source will not be negligible and the sensor will be costly. Further, in this sensor, there has been a defect that the signal is so feeble as described above that, in case a piezo-electric element is used for the signal detecting element, due to the quick ambient temperature fluctuation, the pyroelectricity produced in the piezoelectric element will not be negligible.

Further, in the above mentioned already provided sensor, as the resonance system is formed of only a mere thin plate, the vibration of the car body in the direction along the surface of the thin plate can not be sensed and, in this respect, too, the theft and the like of the automobile have not been likely to be positively sensed.

SUMMARY OF THE INVENTION

This invention has it as an object to provide a sensor of the theft and the like of an automobile wherein, when a vibration of a frequency in a comparatively wide range of the frequency band below several 10 Hz is produced in an automobile, a comparatively large signal will be able to be obtained, as there is no directivity in sensing the vibration, the vibration of the automobile in all the directions of 360 degrees can be sensed and the formation is simple and cheap.

For this purpose, in the formation of the present invention, a thin plate is fixed at one end to a base, an elastic string is stretched between the other end of the thin plate and a supporting plate provided from the above mentioned base, a weight is provided in the middle of the string and a sheet-shaped buffer material, conductive thin plate and piezoelectric element are successively pasted to the above mentioned thin plate.

According to the present invention, the base is fitted to such proper place as within the body of an automobile directly or through a casing or the like so that, when the car body vibrates, the vibration will be transmitted to the base and supporting plate to vibrate the weight. By the vibration of the weight, the thin plate will be vibrated. As a result, a mechanical extending and contracting force will be applied to the piezoelectric element through the sheet-shaped buffer material and conductive thin plate and an electric signal as a sensing signal will be obtained from the piezoelectric element.

In the present invention, the resonance frequency of the above mentioned weight is determined by the mass of the weight and tension of the string and the resonance sharpness is determined by the tension of the string and the thickness and material of the thin plate. Therefore, by properly selecting the mass of the weight, the tension of the string and the thin plate, the resonance frequency of the weight can be made below several 10 Hz and the resonance sharpness can be made comparatively small. Therefore, according to the present invention, when a vibration of a frequency in a comparatively wide range of the frequency band below several 10 Hz is automatically produced, a comparatively large signal will be able to be obtained from the piezoelectric element.

Therefore, according to the present invention, there are advantages that, as the low frequency vibration of an automobile is detected, no mis-operation will be made by any unnecessary foreign acoustic noise or the like and the fitting place will not be limited. There is a further advantage that, as the resonance sharpness is smaller than in the conventional low frequency vibration sensor and the vibration in a comparatively wide range can be sensed, even if the kind of the automobile and the loaded weight are different, the theft and the like will be able to be positively sensed. Further, there are advantages that, as a comparatively large signal is obtained from the piezoelectric element, the S/N ratio will be large and no mis-operation will be likely to be made by such noises as the noise by the pyroelectricity peculiar to the piezoelectric element and the current source noise and that, as no amplifier of a high amplitude and no low pass filter are required, the sensor can be provided at a low cost.

Further, in the present invention, as the weight is provided in the middle of the elastic string and therefore can be vibrated in all the directions, even if the weight vibrates in any direction, the thin plate will vibrate in the bending direction. Therefore, there is no directivity in sensing the vibration and the vibration of the automobile in all the directions of 360 degrees can be sensed. In this respect, too, there is an advantage that the theft and the like of the automobile can be positively sensed.

By the way, the sheet-shaped buffer material acts to protect the piezoelectric element from being damaged by a large vibration caused to the thin plate by a shock or the like while the automobile is running.

DESCRIPTION OF THE PREFERRED EMBODIMENTS

Figure 1:
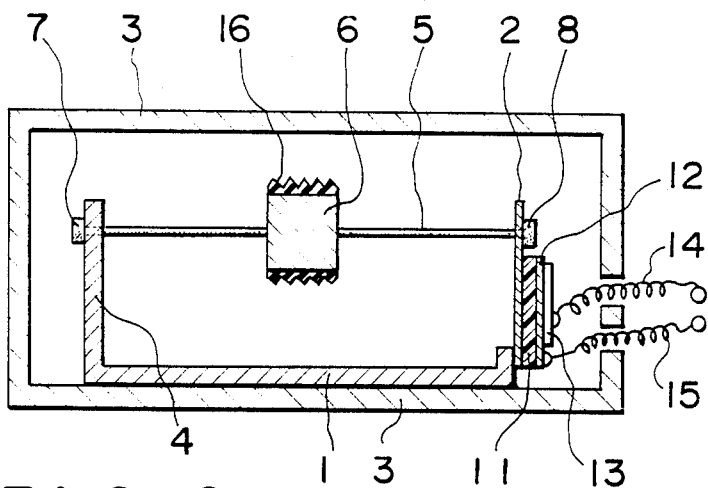
FIG. 1 is a vertically sectioned view showing an embodiment of the sensor of the theft and the like of an automobile according to the present invention.

The present invention shall be explained in detail in the following on the basis of the embodiments shown in the drawings.

Figure 2:
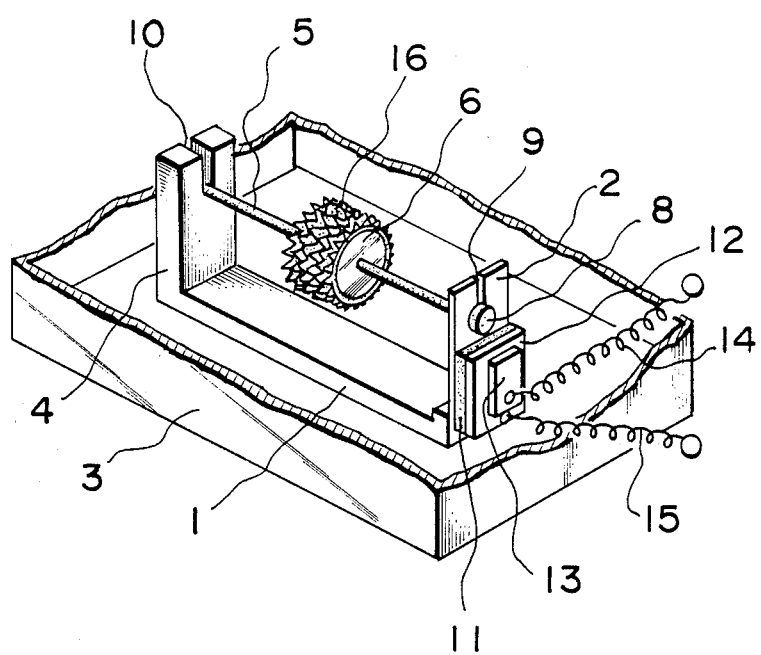
FIG. 2 is a perspective view showing an essential part of the same.

FIG. 1 is a vertically sectioned view of the sensor of the theft and the like of an automobile according to the present invention. FIG. 2 is a perspective view showing an essential part of the same.

In FIGS. 1 and 2, the reference numeral 1 represents a base and 2 represents a thin plate fixed at one end to the base 1.

The material and shape of the thin plate are not limited but, in the base of the illustrated embodiment, a rectangular metal plate is used for the thin plate 2. Also, in the case of the illustrated embodiment, the base 1 is contained is a casing 3 together with the later described other component parts and is fixed to the casing 3. Needless to say, the base 1 can be substituted with the wall surface itself of the casing 3.

Also, in the present invention, a supporting plate 4 is provided from the base 1, an elastic string 5 is stretched between the supporting plate 4 and the other end of the above mentioned thin plate 2 and a weight 6 is provided in the middle of the string 5.

In the case of the illustrated embodiment, the above mentioned supporting plate 4 is formed integrally with the base 1 but can be also substituted with the wall surface itself of the above mentioned casing 3 and the string 5 can be also fixed at one end to the wall surface of the casing 3. The above mentioned string 5 may be elastic and can be of any material but is preferably of a silicone rubber low in the variation with the lapse of years. Further, in the case of the illustrated embodiment, stoppers 7 and 8 are respectively integrally formed at both ends of the string 5. Grooves 9 and 10 are provided respectively at the other end of the above mentioned thin plate 2 and in the supporting plate 4. The string 5 is inserted at both ends respectively into the above mentioned grooves 9 and 10 while being stretched and are then bonded with a bonding agent or the like. Needless to say, the string 5 may be stretched by any other means.

Further, in the present invention, a sheet-shaped buffer material 11, conductive thin plate 12 and piezoelectric element 13 are pasted successively to the above mentioned thin plate 2. In the case of the illustrated embodiment, a piezoelectric ceramic is used for the piezoelectric element 13. In the drawings, the reference numerals 14 and 15 represent lead wires for taking out output signals. The above mentioned conductive thin plate 12 acts as an electrode on the piezoelectric element 13 pasting surface side.

In the case of the illustrated embodiment, a buffer material 16 having a rugged surface is provided on the outside surface of the above mentioned weight 6 and has an advantage that, even if the weight 6 is so greatly vibrated by a large shock as to collide with the casing 3 as while the automobile is running, the shock will be reduced.

According to the present invention of the above mentioned formation, the casing 3 is fitted in such proper space within the engine compartment, chassis, passenger compartments, center pillar or trunk of the automobile. Therefore, when the car body vibrates, the vibration will be transmitted to the casing 3, base 1 and supporting plate 4 and the weight 6 will vibrate. By the vibration of the weight 6, the thin plate 2 will be also vibrated. As a result, a mechanical extending and contracting force will be applied to the piezoelectric element 13 through the sheet-shaped buffer material 10 and conductive thin plate 12 and an electric signal as a sensing signal will be obtained between the lead wires 14 and 15. The resonance frequency f of the above mentioned weight 6 is $$f = \frac{1}{\pi} \sqrt{\frac{T}{lm}}$$

where m is the mass of the weight 6, l is the length of the string 5 and T is the tension of the string 5. After all, the resonance frequency of the weight 6 is determined by the mass of the weight 6 and the length and tension of the string 5. Also, by the experiments made by the present inventor, it has been confirmed that the resonance sharpness of the weight 6 is determined by the tension of the string 5 and the thickness and material of the thin plate 2.

Therefore, by properly selecting the mass of the weight 6, the length and tension of the string 5 and the thin plate 2, the resonance frequency of the weight can be made below several 10 Hz and its resonance sharpness can be made comparatively small. In this respect, according to the experiments made by the present inventor, it has been confirmed that, when the above mentioned resonance frequency is set at about 20 Hz, the resonance sharpness will be able to be set at about 1/10 that of the conventional low frequency vibration sensor. Therefore, according to the present invention, when a vibration of a frequency in a comparatively wide range of the frequency band below several 10 Hz is produced in the automobile, a comparatively large signal will be able to be obtained from the piezoelectric element 13.

Therefore, according to the present invention, as the low frequency vibration of the automobile is detected, no mis-operation will be made by an unnecessary foreign acoustic noise or the like and the fitting place will not be limited. Also, as the resonance sharpness is smaller than in the conventional low frequency vibration sensor and a vibration in a comparatively wide range can be sensed, even if the kind of the automobile and the loaded weight are different, the theft and the like will be able to be positively sensed. Further, as a comparatively large signal is obtained from the piezoelectric element, the S/N ratio will become large, no mis-operation will be likely to be made by such noises as the noise by the pyroelectricity peculiar to the piezoelectric element and the current source noise, no amplifier of a high amplification degree and no low pass filter will be required and the sensor will be able to be provided at a low cost.

Also, in the present invention, as the weight 6 is provided in the middle of the elastic string 5 and therefore can be vibrated in all the directions, even if the weight 6 vibrates in any direction, the thin plate 2 will be vibrated in the bending direction by this vibration. Therefore, there is no directivity in sensing the vibration and the vibration of the automobile in all the directions of 360 degrees can be sensed. In this respect, too, the theft and the like of the automobile can be positively sensed.

The sheet-shaped buffer material 11 acts to protect the piezoelectric element 13 from being damaged in case of large vibration is caused to the thin plate by the shock or the like while the automobile is running.

Figure 3:
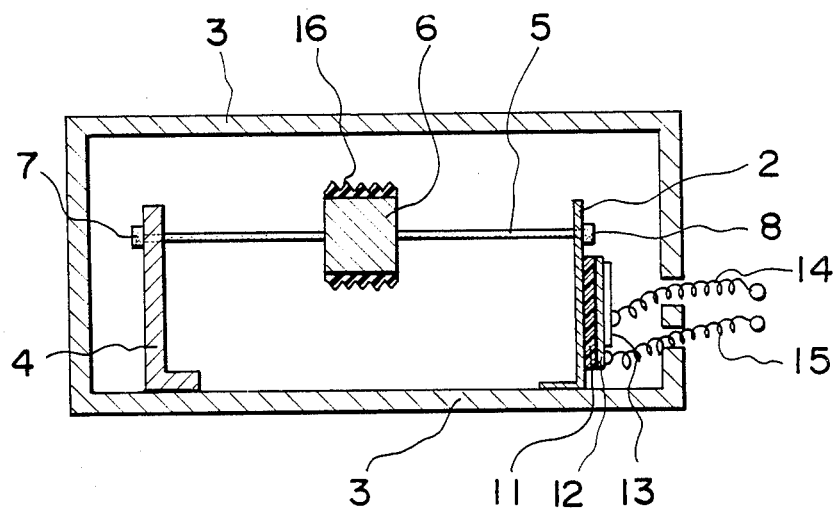
FIG. 3 is a vertically sectioned view showing another embodiment of the sensor of the theft and the like of an automobile according to the present invention.

FIG. 3 shows another embodiment of the present invention. The same reference numerals are attached to the same component parts as of the above mentioned embodiment in FIGS. 1 and 2. The difference of this embodiment from the above mentioned embodiment in FIGS. 1 and 2 is that the base 1 shown in FIGS. 1 and 2 is omitted and is substituted with the wall surface of the casing 3.

As described in detail in the above, according to the present invention, when a vibration of a frequency in a comparatively wide range of the frequency band below several 10 Hz is produced in an automobile, a comparatively large signal will be able to be obtained. Thereby, there are obtained the following effects. First, there is obtained an effect that no mis-operation will be made by any unnecessary foreign acoustic noise or the like and the fitting place will not be limited. Second, there is obtained an effect that, even if the kind of the automobile and the loaded weight are different, the theft and the like will be able to be positively sensed. Third, there is obtained an effect that the S/N ratio is so large that no mis-operation will be likely to be made, no amplifier of a high amplification degree and no low pass filter will be required and the sensor will be able to be provided at a low cost.

Further, according to the present invention, there is no directivity in sensing the vibration and the vibration of the automobile in all the directions of 360 degrees can be sensed. In this respect, too, there can be obtained an effect that the theft and the like of the automobile can be positively sensed.

What is claimed is:

1. A theft for an automobile characterized in that a thin plate is fixed at one end to a base, an elastic string is stretched between the other end of the thin plate and a supporting plate provided from the above mentioned base, a weight is provided in the middle of the string and a sheet-shaped buffer material, conductive thin plate and piezoelectric element are successively pasted to the above mentioned thin plate.

2. A theft sensor according to claim 1 wherein a buffer material is provided on the outside surface of the weight.

* * * * *